Feb. 15, 1966 H. HURVITZ 3,235,799
ELECTROLUMINESCENT FREQUENCY SENSITIVE VISUAL INDICATOR
Filed Dec. 27, 1954 2 Sheets-Sheet 2

INVENTOR
Hyman Hurvitz

3,235,799
ELECTROLUMINESCENT FREQUENCY SENSITIVE VISUAL INDICATOR
Hyman Hurvitz, 737 Warner Bldg., Washington 4, D.C.
Filed Dec. 27, 1954, Ser. No. 477,892
3 Claims. (Cl. 324—78)

The present invention relates generally to visual devices, and more particularly to frequency sensitive visual devices employing electroluminescent indicators.

It is known that phosphors exist which are luminescent in response to time-varying electric fields. These phosphors may be incorporated in a solid dielectric carrier, which may be a semi-conductor or a dielectric, and when so incorporated the carrier, with its phosphor, acts as a field sensitive luminous element, which is essentially a capacitance, or condenser. Such elements have been described in U.S. Patent to E. L. Mager 2,624,857, to which reference is made for further detailed information.

In accordance with the present invention a capactive field-sensitive luminous element is included in circuit with a tuning element, which may be itself resonant, or which may resonate with the capacity of the element. The resonant element may be piezo-electric, which leads to particularly simple structures, and to extremely sharp resonances. In order to enable analysis of a band of frequencies, by means of a single device based on the principles of the present invention, I use a plurality of piezo-electric elements in conjunction with a single luminous element, and also use wedge shaped elements which have different electrical properties, at different positions of the wedge, and consequently different resonant frequencies.

It is, accordingly, a broad object of the present invention to provide a resonant luminous body.

It is another object of the invention to provide a multiply-resonant luminous device.

It is a further object of the invention to provide an electro-luminescent device which is frequency sensitive.

It is another object of the invention to provide a resonant circuit having an electro-luminescent dielectric electrically coupled thereto in such manner as to establish luminous conditions for preselected frequencies.

It is still another object of the invention to provide a resonant circuit including an electroluminescent circuit element, which contributes to the establishment of resonant conditions in the circuit.

The above and still further objects, features, and advantages of the invention will become apparent upon consideration of the following detailed description of a specific embodiment of the invention, especially when taken in conjunction with the accompanying drawings, wherein.

Figure 1A:
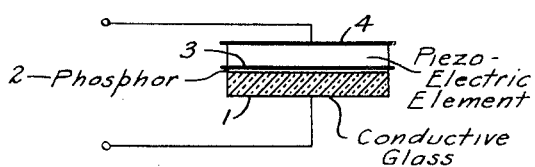
FIGURE 1a illustrates in transverse cross section the structure of a resonant luminescent element consisting of a piezo-electric element and a dielectric phosphor in series.

Referring now more particularly to FIGURE 1a of the accompanying drawings, reference numeral 1 denotes a plate of electrically conducting glass, or a glass plate coated with a thin, transparent, electrically conductive coating, as taught by Mager Patent No. 2,624,857. A layer 2 of field sensitive phosphor in a dielectric carrier is coated on the glass plate 1. A piezo-electric plate having the usual plated electrodes, is cemented to the layer 2, so that one electrode 3 makes continuous contact with the layer 2, and the remaining electrode 4 is free. When a source of A.C. voltage is applied between the electrode 4 and the glass plate 1, a number of different resonance conditions may exist.

Figure 2:
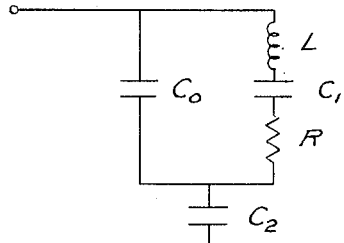
FIGURE 2 is a schematic circuit diagram of a piezo-electric circuit in series with a capacitance.

The equivalent circuit corresponding with the structure of FIGURE 1a, is illustrated schematically in FIGURE 2. Here $C_0$ represents the clamped capacity of the crystal and L, $C_1$, and R the equivalent series inductance, capacitance, and resistance of the crystal considered as a resonant element. The condenser $C_2$ then represents the capacity of the luminous element, assumed for the purpose of approximately analysis to be loss-free.

It will be clear from the diagram that the applied voltage is normally divided bewteen $C_2$ and $C_0$ plus L, C, R taken in parallel. So long as the crystal is not in series resonance its impedance is high, so that the voltage available across the condenser $C_2$ is determined by the relative capacities of $C_0$ and $C_2$. The voltage supplied may then be too low to cause the luminous element to glow. When, however, the crystal is resonant, it effectively short circuits the condenser $C_0$, and the entire supply voltage appears across the condenser $C_2$. Under these conditions adequate voltage is available at $C_2$ for luminous emission. It is then desirable that the capacity of $C_1$ be very high relative to that of $C_0$, for maximum sensitivity, and maximum dynamic range, if the input voltage is of variable amplitude. Since a high capacity is associated with a thin layer of phosphor, and since the layer of phosphor glows at a threshold voltage which is inversely proportional to its thickness, it is clear that a thin layer of phosphor is preferable, and values as low as .001″ to .01″ are recommended, for frequencies of the order of 1 mc. or higher.

Figure 1B:
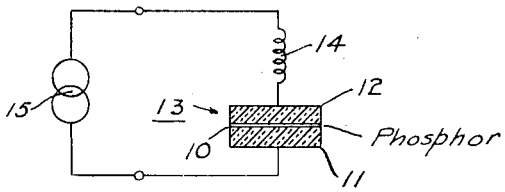
FIGURE 1b illustrates a variation of the system of FIGURE 1a, including a dielectric phosphor condenser in series with a resonating inductance.

In order to increase the voltage sensitivity of the system, resort is had to the arrangement of FIGURE 1b. Here 10 is a layer of field sensitive phosphor, arranged between two layers 11, 12 of conductive glass, to form a luminous condenser 13, and 14 is an inductance connected in series with luminous condenser 13 and a source of H.F. voltage 15, of frequency $f_0$. The value of the inductance 14 is selected to resonate with the capacity of condenser 13. Accordingly, the voltage across the condenser 13 is reduced except when the circuit is resonant, i.e. when source 15 supplies a frequency $f_0$. For that frequency an extremely high voltage appears cross the condenser 13, equal numerically to the input voltage times the Q of the resonant circuit. Since values of Q equal to 50 are readily obtainable, relatively sensitive operation is achieved.

Figure 1C:
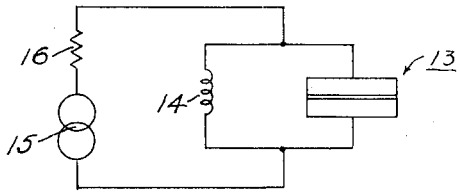
FIGURE 1c illustrates a variation of the system of FIGURE 1b, employing a parallel resonating inductance.

In the species of FIGURE 1c the inductance 14 is connected in shunt to the luminous condenser 13. The source 15 is in series with a relatively high resistance 16. In this circuit, for frequencies considerably removed from resonance, considerable current may flow, reducing the voltage available across condenser 13 by reason of the voltage drop in resistance 16. For resonant conditions the total current drain from the generator 15 is small, so that a small voltage appears across resistance 16 and substantially the entire voltage of the generator 15 appears across the condenser 13. The parameters may be readily designed to cause luminous emission only for substantially resonant conditions.

Figure 3:
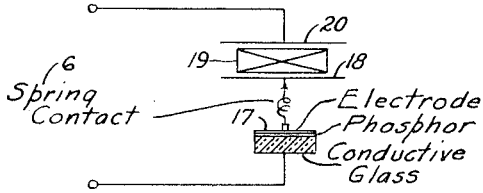
FIGURE 3 illustrates a structural arrangement for combining a high Q piezo-electric crystal with a luminous dielectric.

The provision of a dielectric layer on a resonant crystal reduces the Q of the crystal, and hence increases its resonance band-width. For some purposes this is acceptable, or even desirable. When not acceptable or desirable, the phosphor may be provided with a conductive electrode 17, as shown in FIGURE 3, which may be connected with an electrode 18 of piezo-electric crystal 19 by means of a thin cat-whisker or spring lead 6. The remaining electrode 20 of crystal 19 may then be connected to an external circuit. In this arrangement extremely high circuit Q is attainable, the losses of the circuit being substantially only those provided by the luminous condenser, and the losses of the crystal itself being entirely negligible.

Figure 4:
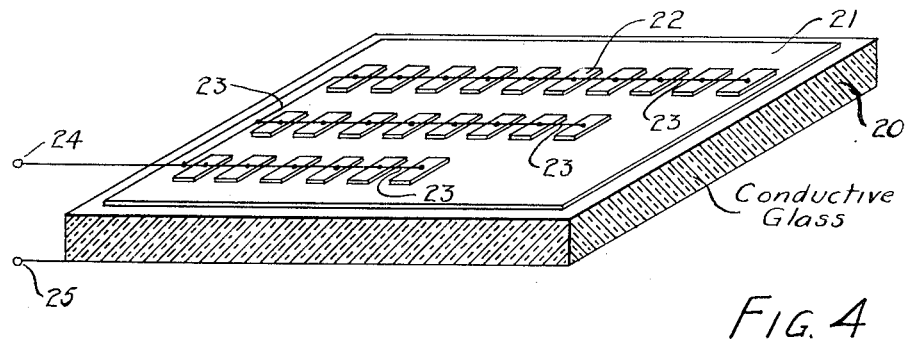
FIGURE 4 illustrates in perspective a multiple frequency spectrum analyzer, comprising a single luminous dielectric element and a plurality of piezo-electric elements of different frequencies.

In FIGURE 4 a relatively extensive plate 20 of conductive glass is employed as one electrode, and as a support. A layer 21 of field sensitive phosphor is then placed on the plate 20, and a plurality of piezo-electric crystals 22, having the usual plated electrodes, are placed on the layer of phosphor. The several crystals may all be connected in parallel by means of leads 23 to an input terminal 24. The plate 20 may be connected to a further input terminal 25. The several crystals may be selected to be resonant to different frequencies, arranged in order within a frequency spectrum, and a selected frequency spectrum will find at least one responsive crystal.

Upon application of a relatively complex spectrum to the terminals 24, 25, luminous emissions will appear through the plate 20, under those of crystals 22 which are resonant to frequencies in the spectrum.

Figure 5:
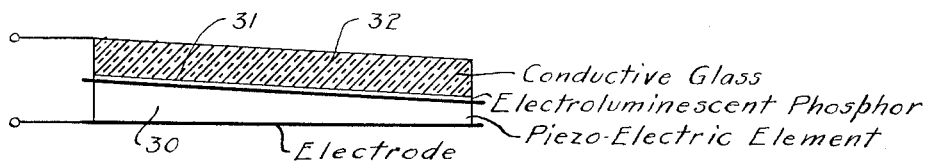
FIGURE 5 illustrates in transverse cross section a piezo-electric element of varying thickness associated with a coating of luminous dielectric material.
Figure 6:
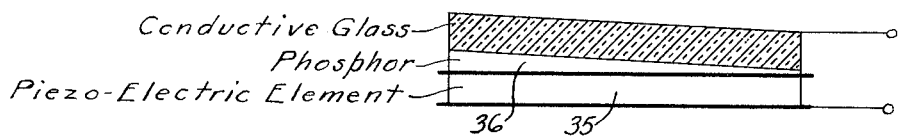
FIGURE 6 illustrates in traverse cross section a piezoelectric element of constant thickness associated with a coating of luminous dielectric material of varying thickness.

In order to avoid the necessity for a plurality of discrete piezo-electric crystals, resort may be had to the structures of FIGURES 5 and 6. In FIGURE 5 the piezo-electric plate 30 is of varying thickness along its length. A layer of phosphor 31 of uniform thickness is placed on one of its faces, and a conductive glass plate 32 superposed on the layer of phosphor. The piezo-electric plate 30 is then resonant to different frequencies at different positions along its length, its resonant frequency being inversely proportional to its thickness, in accordance with the formula $$f = \frac{10^6}{3.68t}$$

where $f$ is resonant frequency, and $t$ thickness. Since luminous emission occurs only in series with a resonant portion of the crystal, such emission may be displaced along the length of the unit by varying the applied frequency.

In the species of FIGURE 6 the piezo-electric plate 35 is of uniform thickness, and the layer of phosphor 36 is of variable thickness. The thickness of the phosphor affects the resonant frequency of the circuit slightly, by placing a capacity in series with the crystal. This effect on frequency, however, is different for different positions of the crystal, so that emission occurs from different points of the phosphor layer, as the applied frequency is varied.

Figure 7:
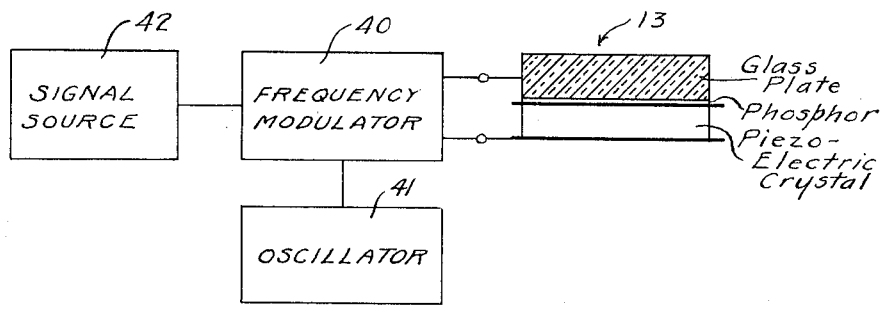
FIGURE 7 illustrates schematically a frequency dependent light modulator circuit.

The system of FIGURE 7 relates to a light modulator of extreme sensitivity. It will be clear that any of the devices hereinabove described may be operated as a light modulator by applying signals of variable amplitude thereto. In the system of FIGURE 7 the amplitude of luminous emission may be controlled by varying the frequency applied to a voltage sensitive element, over a portion of either a positive or negative slope of the frequency responsive curve of the element. The luminous element 13, hereinbefore described in detail, is supplied with voltage by a frequency modulator 40, which in turn is supplied with carrier by an oscillator 41 and with a modulating signal by a signal source 42. The unmodulated frequency of the oscillator 41 is selected to be located approximately midway of the positive slope of the resonance curve of the luminous element 13. The range of frequency variation provided for frequency modulator 40, in response to the range of amplitudes provided by signal source 42, is such as to assure operation along the positive slope of the resonance curve, and preferably along a substantially linear portion thereof. A quite small variation of frequency will provide a large variation of voltage across the element 13, because of the extremely selective nature of the circuits.

It will further be clear, in the systems of FIGURES 5 and 6, that for any given frequency the width of the visual display produced by a signal at that frequency will be a function of the amplitude of the applied signal, but that the center point of any display will be representative of frequency only.

It will be appreciated by those skilled in the art that the inductors of FIGURES 1b and 1c may be the inductance of a piezo-electric crystal, when operated at a frequency above resonance. It is, therefore, possible to achieve a resonant rise in voltage across a capacitive luminous indicator, in any of the systems illustrated which employ piezo-electric resonators, by operating at a suitable frequency.

While I have described and illustrated a specific embodiment of the present invention it will be clear that variations of the specific details of construction may be resorted to without departing from the true spirit and scope of the invention as defined in the appended claims.

What I claim is:

1. A visual frequency sensitive indicator including a material capable of luminescing in response to a time varying electric field, a high resistance dielectric binder for said material, said material dispersed in said binder, a resonant piezo-electric element, said binder having said material dispersed therein being in physical and electrical contact with said piezo-electric element.

2. In combination, an extensive transparent support, a layer of field-responsive phosphor embedded in a solid dielectric material coated on said support, at least one piezo-electric crystal in physical and electrical contact with said solid dielectric material, and a source of time varying electric field connected in series with said piezo-electric crystal and said dielectric material.

3. In combination, a layer of piezo-electric material, a layer of dielectric material secured to said layer of piezo-electric material, and a quantity of electroluminescent material dispersed through said dielectric material.

References Cited by the Examiner

UNITED STATES PATENTS

| | | | |
|---|---|---|---|
| 1,685,810 | 10/1928 | Giebe | 324—80 |
| 1,814,399 | 7/1931 | Meissner | 324—80 X |

(Other references on following page)

UNITED STATES PATENTS

| | | | |
|---|---|---|---|
| 1,817,030 | 8/1931 | Eberhard | 324—80 |
| 1,830,532 | 11/1931 | Eberhard | 324—80 X |
| 2,247,051 | 6/1941 | Chilowsky et al. | 178—6 |
| 2,306,555 | 12/1942 | Mueller | 332—26 X |
| 2,339,198 | 1/1944 | Smith | 324—80 X |
| 2,508,098 | 5/1950 | Chilowsky. | |
| 2,602,836 | 7/1952 | Foster et al. | 324—77 |
| 2,624,857 | 1/1953 | Mager. | |
| 2,694,785 | 11/1954 | Williams | 315—58 |
| 2,698,915 | 1/1955 | Piper. | |
| 2,780,731 | 2/1957 | Miller | 313—108.1 |
| 2,858,363 | 10/1958 | Kazan | 313—108.1 |
| 2,894,145 | 7/1959 | Lehovec | 332—3 X |

WALTER L. CARLSON, *Primary Examiner.*

LEO QUACKENBUSH, SAMUEL BERNSTEIN, RALPH G. NILSON, FREDERICK M. STRADER, *Examiners.*